United States Patent
Andersson et al.

[19]

[11] Patent Number: 5,937,002
[45] Date of Patent: Aug. 10, 1999

[54] CHANNEL HOPPING IN A RADIO COMMUNICATION SYSTEM

[75] Inventors: Claes Håkan Andersson, Ekerö ; Knut Magnus Almgren, Sollentuna, both of Sweden

[73] Assignee: Telefonaktiebolaget LM Ericsson, Stockholm, Sweden

[21] Appl. No.: 08/765,945

[22] PCT Filed: Jul. 13, 1995

[86] PCT No.: PCT/SE95/00854

§ 371 Date: Jan. 13, 1997

§ 102(e) Date: Jan. 13, 1997

[87] PCT Pub. No.: WO96/02979

PCT Pub. Date: Feb. 1, 1996

[30] Foreign Application Priority Data

Jul. 15, 1994 [SE] Sweden .................................. 9402492

[51] Int. Cl.$^6$ .................................................. H04B 15/00
[52] U.S. Cl. ........................ 375/202; 370/329; 370/330; 370/331; 370/332; 370/431
[58] Field of Search .................. 370/208–209, 370/341–342, 329; 375/200, 205–206, 208, 232, 267, 344, 354; 455/62, 67.1, 67.3–67.4, 69, 226.1, 406, 423, 445, 447, 450, 513

[56] References Cited

U.S. PATENT DOCUMENTS

| | | |
|---|---|---|
| 4,355,399 | 10/1982 | Timmon . |
| 4,479,226 | 10/1984 | Prabhu et al. . |
| 4,670,906 | 6/1987 | Thro . |
| 4,677,647 | 6/1987 | Aoyagi ..................................... 375/344 |
| 4,716,573 | 12/1987 | Bergström et al. . |
| 4,780,885 | 10/1988 | Paul et al. .................................. 375/40 |
| 4,872,205 | 10/1989 | Smith . |
| 4,984,247 | 1/1991 | Kaufmann et al. ...................... 375/200 |
| 4,998,290 | 3/1991 | Olenick et al. . |
| 5,210,771 | 5/1993 | Schaeffer et al. . |
| 5,311,541 | 5/1994 | Sanderford, Jr. . |
| 5,335,356 | 8/1994 | Andersson et al. ..................... 455/54.1 |
| 5,488,649 | 1/1996 | Schellinger ............................... 379/62 |
| 5,530,917 | 6/1996 | Andersson et al. ..................... 455/54.1 |
| 5,574,974 | 11/1996 | Almgren et al. ........................ 455/33.1 |
| 5,619,524 | 4/1997 | Ling et al. ............................... 375/200 |
| 5,666,649 | 9/1997 | Dent ........................................ 455/445 |

FOREIGN PATENT DOCUMENTS

| | | |
|---|---|---|
| 0 593 289 A2 | 10/1993 | European Pat. Off. . |
| 3415032 A1 | 4/1984 | Germany . |
| 2 203 314 | 4/1987 | United Kingdom . |
| 2 261 141 | 11/1992 | United Kingdom . |

*Primary Examiner*—Stephen Chin
*Assistant Examiner*—Joseph Roundtree
*Attorney, Agent, or Firm*—Burns, Doane, Swecker & Mathis, L.L.P.

[57] ABSTRACT

The invention relates to a method and to an arrangement for effecting base orthogonal channel hopping between mobile stations (MS1–MS3) and a base station in a radio communications system. Connections (F1–F3) having low attenuation are allotted a number of channels having high interference I (channel, t). Connections (F1–F3) that have higher attenuation are allocated a number of channels that have lower interference I (channel, t). A channel allocation means (211) in the base station functions to produce channel hopsequences which are transferred to hopsequence lists (204–206) in the mobile stations (MS1–MS3), via a control channel SACCH. The channel hopsequences are also transferred to corresponding hopsequence lists (201–203) in the base station. Attenuation of the connections (F1–F3) and interference on the channels I (channel, t) are measured continuously in the channel allocating means (211), wherein the best channels with respect to interference are used. The channel allocation means creates the channel hop sequences in accordance with the principle that the better a connection with respect to attenuation, the poorer the channels with respect to interference that are allocated to the connection.

24 Claims, 7 Drawing Sheets

CHANNEL HOPPING IN A RADIO COMMUNICATION SYSTEM

TECHNICAL FIELD

The present invention relates to the field of radio communications and then particularly, but not exclusively, to a method of channel hopping between different channels of a radio communications system. The invention also relates to the radio communications system in which the method is implemented.

DESCRIPTION OF THE BACKGROUND ART

The term "channel hopping" is used in this document as a collective designation for hops between different information transmission channels, for instance such as hops solely between frequencies, hops solely between time slots, and hops between both frequencies and time slots in a radio communications system.

The person skilled in this art is well aware of the fact that frequency hopping can be used in a radio communications system to improve the performance of the radio system or to guard against unauthorized listening of the radio communication, among other things. Frequency hopping is carried out in a predetermined order in such systems, without paying attention to the instant quality of the connection. Frequency hopping in radio communications systems is thus not adapted.

There can be established between a transmitter and a receiver of a radio communications system a radio connection over which radio communication can take place. The connection is bidirectional by virtue of a downlink which forms the connection in a direction from a base station in the system to a mobile station, and an uplink which forms the connection in the opposite direction, from the mobile station to the base station. The transmission and reception of radio traffic for different connections is effected on channels which can be defined by a certain frequency in an FDMA system or by a combination of a certain frequency and a certain time slot in a system which uses TDMA (Time Division Multiple Access). In a CDMA system, a channel can be defined by a code. Seen generally, the channels that are available in a radio communications system are liable to be disturbed by other radio traffic to different degrees of disturbance, and also by radio signals on the same channels used for other connections, each channel in the system having a certain interference level. Thus, if each connection uses only one channel, the connections will suffer different levels of interference. The levels of interference in certain connections may be so high as to prevent an acceptable connection quality being obtained. These disparities in connection quality can be levelled out by hopping between different channels, wherewith the connections utilize both channels of low and high interference levels. The use of the high interference channels is therewith spread out between the various connections, and when considering the system as a whole more connections can be given an acceptable quality with the aid of interleaving and error correction coding. Each connection can be allocated a plurality of channels, wherein the system controls the connections as communication proceeds, by causing the connections to hop between the channels in accordance with a given hop rule. This rule may be, for instance, a predetermined pseudo-random series, in which case the connections hop seemingly at random between all available channels; see for instance European Patent Application EP 93905701-4. However, the level of interference may become unnecessarily high when this type of channel hopping is used, since the channels are not always allocated to the connections in an optimal fashion when using a pseudo-random series.

A radio communications system will normally include a number of channels that can be used for connections between a given base station and mobile stations. In this case, it is important that the same channels are not used at the same time for two or more connections between the base station and mobile stations. If two transmitters transmit different signals to their respective receivers simultaneously on one and the same channel, it is very likely that at least one receiver will be disturbed by interference from the transmission to the other receiver. If the aforesaid situation cannot occur, i.e. when only one base station connection can be transmitted on a channel at a time on any one occasion, there is obtained what is known as "orthogonality in the base station" or "base orthogonality".

When a connection in a radio communication system is excessively bad, wherewith no acceptable connection quality is obtained, this may be due to the fact that the ratio between signal strength and interference is too low, among other things. The signal strength referred to in this regard is the strength of the received desired signal. By interference is meant the sum of the signal strengths of all received undesirable signals on the channel used. These undesirable signals arrive primarily from other connections that use the same channel in adjacent cells in the radio communications system. The received undesired signals may also originate from connections within the own cell, or local cell, these connections using a bordering frequency or time slot.

Signal strength is contingent on transmission power and also on the extent to which the desired signal has been attenuated on its way from the transmitter to the receiver. Signal attenuation is determined, among other things, by the distance, the direction and the topology between transmitter and receiver. Other terms used in parallel with attenuation are channel amplification or path gain (channel amplification is negative) and path loss, which are terms well-known to the person skilled in this art.

Several proposals dealing with different frequency of methods are well-known to the art. The following examples of known techniques use frequency hops in different ways to achieve particular objects in different types of communication systems.

German published specification DE 3415032-A1 teaches a frequency hop system in which frequency hopping is effected in a pseudo-random fashion. The frequencies used are monitored and excluded from further use when they no longer have an acceptable interference level.

U.S. Pat. No. 4,998,290 describes a radio communications system which uses frequency hopping. The system includes a central checking station which allocates frequencies for communication with several participant local radio stations. The checking station maintains an interference matrix which reflects the capacity requirement of the different radio stations and the interference state of all connections.

U.K. Patent Application GB 2,261,141 A teaches a method of using frequency hopping in a radio communications system. The method involves monitoring the channels included in the hop sequence and replacing those channels which do not fulfil a quality criterion with new channels.

U.S. Pat. No. 4,872,205 describes a frequency hopping communications system. The system detects automatically when another radio system is within range and then selects another group of frequency hop sequences, with the intention of avoiding mutual interference between systems whose ranges overlap one another.

U.S. Pat. No. 5,210,771 describes a communications system in which each channel is allotted a desired limit value for received signal strength. A channel is allocated to a subscriber in dependence on the received signal strength at a receiving location and by the power control range of the subscriber unit. According to this patent specification, it is desirable to adjust the power of all users dynamically, in a manner such that signals will be received with approximately the same power.

U.S. Pat. No. 4,670,906 describes a method for the dynamic selection of one of a plurality of radio transmitters for transmitting message signals from a primary station to remote stations in a data communications system. The method involves measuring the signal strength of the carrier wave signal received by base stations with each transmission from an indicated remote station, calculating path loss between the indicated remote station and each base station location, while using the measured signal strength for the receiver at this location, calculating the signal strength that can be received at the indicated remote station from each base station, and selecting at least one of the base station transmitters for transmission of a message signal to the indicated remote station.

U.K. Patent Application GB 2,203,314 A describes a frequency hop allocation system for frequency hopping radio stations. According to one object of the invention described in this application, hop data can be allocated to disparate networks, so as to reduce interference between the networks to a level which will not prevent the radio stations from communicating with one another.

U.S. Pat. No. 4,355,399 describes a transmitter and receiver arrangement which enables the performance of an associated user to be controlled by selective, simultaneous transmission of one or more coded frequencies with each time slot of the transmitted sequence, wherein a higher degree of system flexibility is obtained and/or the performance of users with the worst reception conditions can be improved at the cost of those users which have better reception conditions, which results in improved system effectiveness as seen in total.

SUMMARY OF THE INVENTION

The invention deals with the problem of how channels shall be allocated to different connections between a base station and mobile stations that are located within the area covered by the base station. The base station is included in a radio communication system which uses channel hopping, and the channels are allocated so that the connections will not disturb one another to an unnecessary extent, preferably to the smallest possible extent, and so that good connection quality is obtained. The aforesaid problems include the problem as to how orthogonality within the base station can be ensured.

An object of the present invention is thus to optimize the use of available channels in a base station with regard to connection quality of the connections between the base station and mobile stations that are located within the area covered by the base station, while using a channel hopping method to this end. Another object is to ensure the orthogonality in the base station, or the base orthogonality, i.e. to ensure that only one of the base station connections at a time uses a channel which is available in the base station.

The aforesaid problems are solved by means of a method which employs channel hopping between a number of channels to which each connection is allocated. In a highly simplified form, the inventive method involves determining the connection quality of the connections, e.g. signal attenuation, and the channel quality of the channels, e.g. interference. A number of the best channels with regard to channel quality are used, wherein connections in which signal attenuation is high are allocated channels that have the lowest interference of those channels used, and connections with small signal attenuation are allocated to channels that have the highest interference of those channels used.

More specifically, a method may comprise measuring, or likewise determining, a signal attenuation parameter, such as path gain for instance, for the connections. The connections are then arranged in order in accord with the measured signal attenuation parameter. The method also includes measuring or likewise determining on predetermined channels a channel quality parameter, such as interference for instance, for the connections. The channel quality parameter may also be obtained by measuring the C/I value or the bit error rate, BER for instance, and then calculating an interference value with the C/I value or bit error rate as input data. The channels are then arranged in order in accord with the measured channel quality parameter. Only the best channels with regard to the channel quality parameter are used. Channels are then allocated to the connections in accordance with the principle that a connection which has high attenuation is allocated a number of channels of high channel quality, and a connection with low attenuation is allocated a number of channels of low (lower) channel quality.

It will be noted that the designations high and low channel quality refer to the quality of those channels that are actually used in the channel hopping sequences. Channels which are not used at all in a channel-hopping sequence will have poorer channel quality than the worst channel that is used in a channel-hopping sequence.

The connections then hop between their allocated channels. The procedure can be repeated continuously or intermittently, whereby channel allocation to "old" connections can be updated. Because the procedure is repeated, any newly established connections may also be allocated channels to hop between. The invention also relates to an arrangement for carrying out the method.

The advantages afforded by the invention reside in obtaining an adaptive channel allocation and in ensuring orthogonality in the base station. This results in better use of available channels, by virtue of allocating to a connection that has low attenuation channels that have high interference levels, i.e. high interference in relation to the best channels used, and by virtue of allocating to a connection that has high attenuation channels that have low interference levels, i.e. low interference in relation to the best channels used. The advantages also afford improved connection quality on more connections, an increase in capacity and a lower level of total interference in the radio communications system.

The invention will now be described in more detail with reference to preferred embodiments thereof and also with reference to the accompanying drawings.

BEST MODES OF CARRYING OUT THE INVENTION

Figure 1A:
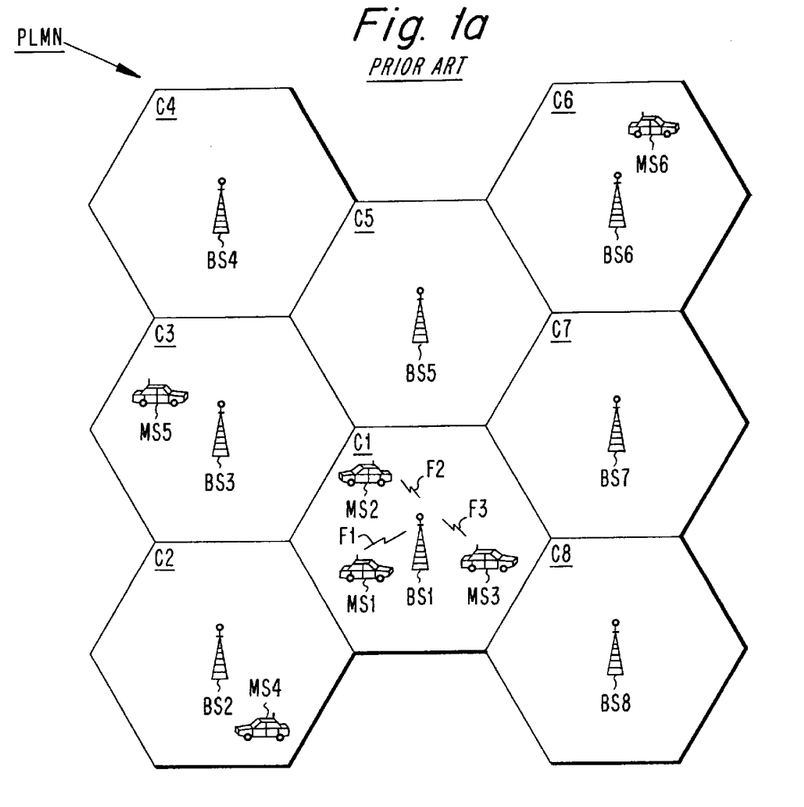
FIG. 1a is a schematic view of part of a radio communications system.

FIG. 1a is a schematic illustration of part of a radio communication system. The system illustrated in the Figure is a cellular public land mobile network PLMN which includes base stations BS1–BS8. Each base station has a given range within which radio communication can be established with mobile radio stations or mobile stations MS1–MS6 located within the coverage area defined by the range of the base station. The cells C1–C8 represent the geographical areas covered by the base stations BS1–BS8. The base stations are connected to the remaining modes of the mobile radio network, such as to base station switching centres, mobile switching centres and gateway-mobile switching centres, in accordance with known technology. These modes are not shown in the Figure and neither are they described in any detail in this context, since they have no particular significance with regard to the present invention.

Figure 1B:
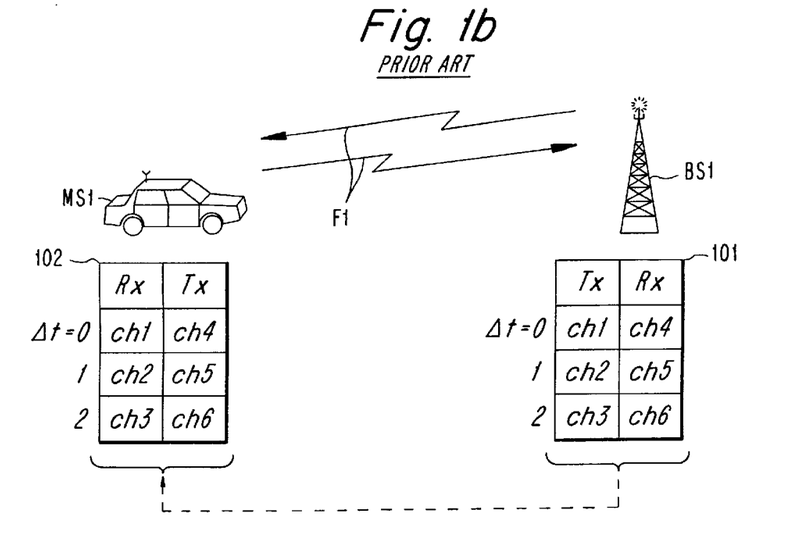
FIG. 1b is a block schematic which illustrates the principle of channel hopping.

FIG. 1b is a schematic illustration of the principle of channel hopping in accordance with the present invention. The base stations in the radio communications system include hop sequence lists. These lists contain information as to which channels the base station shall use in communication with the mobile stations located within the area covered by the base station. Consequently, if a base station serves a plurality of connections to different mobile stations, there is found one hop sequence list for each connection in the base station.

Thus, the base station BS1 in the cell C1 includes a hop sequence list 101 for the connection to the mobile station MS1. The corresponding hop sequence lists for the connections to the mobile stations MS2 and MS3 are not shown in the Figure. The list 101 in the base station BS1 includes three channels ch1–ch3 for transmission, reference Tx, and three channels ch4–ch6 for reception, referenced Rx. Thus, the base station transmitter transmits on channel ch1 in a first time interval $\Delta t=0$, on channel ch2 in a second time interval $\Delta t=1$, and on channel ch3 in a third time interval $\Delta t=2$, these three channels being said to form a channel hop sequence for transmission from the base station BS1 to the mobile station MS1. Transmission from the base station (and the mobile stations) may be time-shifted within the time intervals $\Delta t$, and the time intervals need not follow one another immediately in a TDMA system. The channel ch1 is again used in a fourth time interval, thereby repeating the channel hop sequence. The channel hop sequence ch1–ch3 is then repeated for the length of time that the radio connection is connected to the mobile station MS1, or until new channels are allocated to the hop sequence list 101, in accordance with the following explanation. The receiver in the base station BS1 receives on the channel ch4–ch6 in the time interval $\Delta t=0$, 1 and 2 respectively, whereafter this channel hop sequence is then repeated, similar to the aforedescribed procedure relating to the transmitter. In this example, three channels are used in each channel hop sequence. However, the number of channels used in the channel hop sequences constitutes a system parameter that can be chosen in any appropriate manner, as described below.

The mobile station MS1 has a hop sequence list 102. The channel hop sequences in the hop sequence lists 101 and 102 are identical, although the channel hop sequence which is used for transmission in the base station is, of course, used for receiving in the mobile station, and the channel hop sequence used for reception in the base station is used for transmission in the mobile station. Thus, the channels ch1–ch3 form the channel hop sequence when receiving, and the channels ch4–ch6 form the channel hop sequence when transmitting for $\Delta t=0$, 1, 2 in the mobile station MS1.

The channels stored in the hop sequence list and used by the base stations and the mobile stations are selected in accordance with an inventive method which will be described in more detail below. However, certain fundamental principles can be mentioned at this point. Preferably, a channel hop sequence is generated in the base station, for instance the channel hop sequence for transmission from the base station. The channel hop sequence for reception in the base station can then be given by the so-called duplex spacing, which is the radio channel or frequency spacing between uplink and downlink, as is generally known by the person skilled in this art. The hop sequence list thus obtained in the base station is then transferred to the mobile station via a control channel, where it is used as the hop sequence list for the mobile station, in the aforedescribed manner. The transference of the hop sequence list 101 to the hop sequence list 102 in the mobile station MS1 is illustrated schematically by the broken line in the Figure. It is also possible to generate a channel hop sequence in the mobile station and then utilize the duplex spacing to obtain the other channel hop sequence, therewith acquiring a hop sequence list for the base station. This list is then transferred to the base station on the control channel, as described above.

Alternatively, respective transmission channel hop sequences and reception channel hop sequences can be generated for each connection, either in the base station or in the mobile station, without using the duplex spacing. This alternative can be used in systems which do not use a duplex spacing, such as the DECT system, for instance. This is described below with reference to an embodiment illustrated in FIG. 6.

Figure 2:
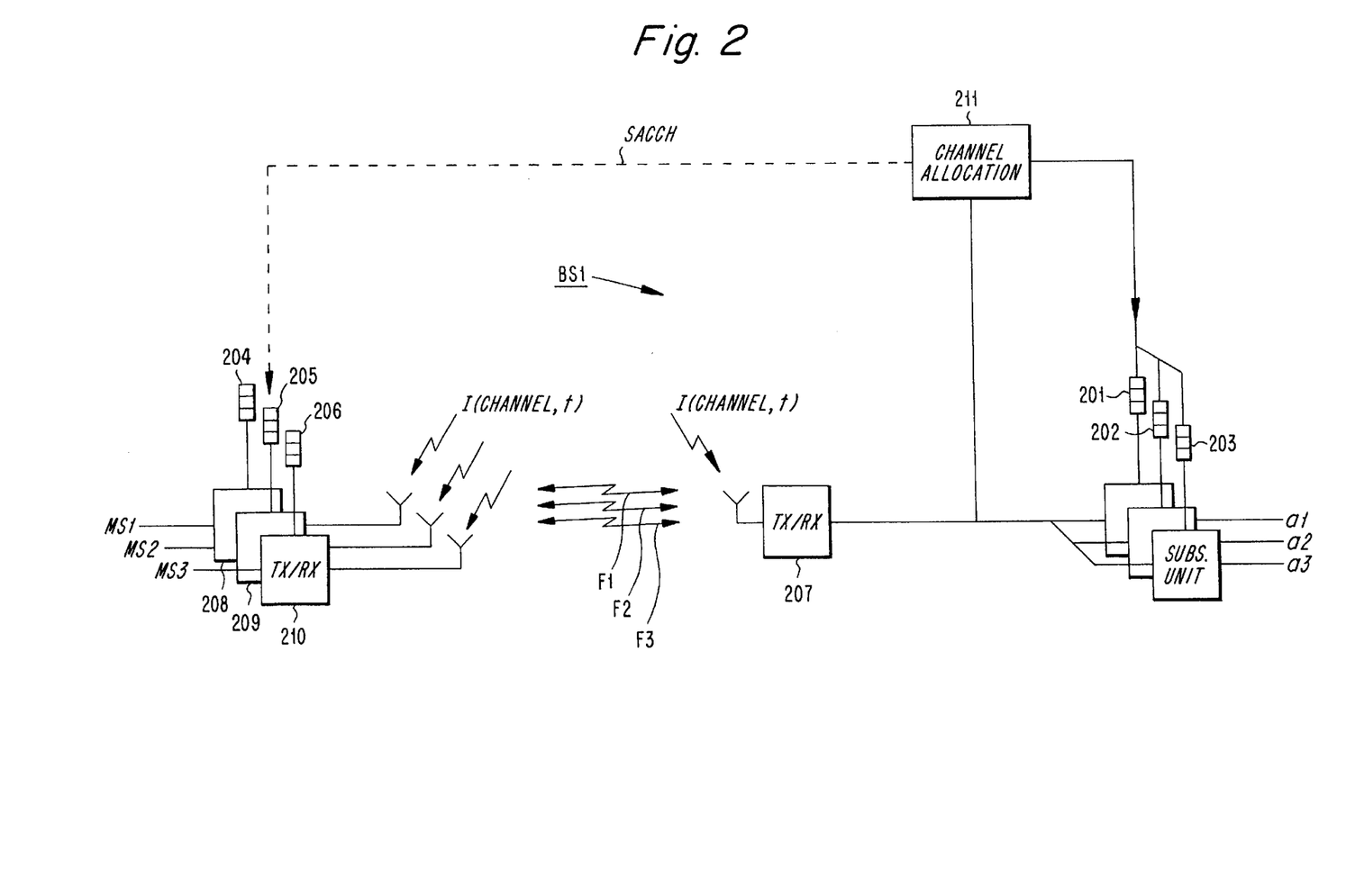
FIG. 2 is a block schematic illustrating three mobile stations and a base station located in a cell in the radio communications system, and also illustrating the inventive channel hopping principle.
Figure 3:
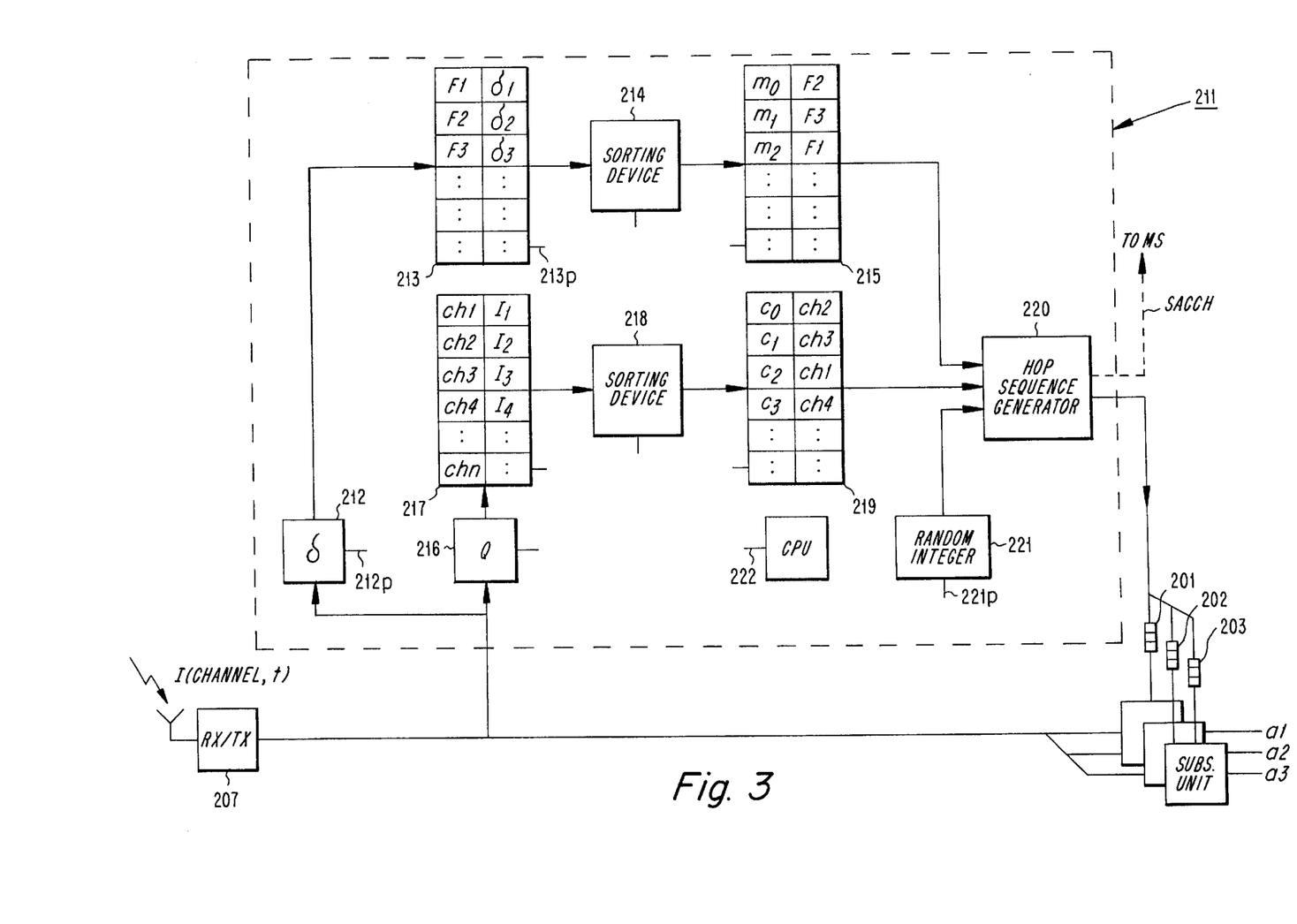
FIG. 3 is a block schematic illustrating a first exemplifying embodiment of the invention.

FIG. 2 is a block schematic which illustrates schematically the three mobile stations MS1–MS3 and the base station BS1 in the cell 1 of the FIG. 1a illustration. The base station includes means such as circuits for hop sequence lists 201–203 for each of the three connections between the subscribers a1–a3, which may be static or mobile subscribers, and the mobile stations MS1–MS3. Each of the mobile stations includes circuits for its respective hop sequence list 204–206, these lists corresponding to the hop sequence lists in the base station, as explained above. It is assumed in this example that the hop sequence lists 201–206 include three transmission channels and three reception channels. The base station includes a transmitter/receiver part 207, which transmits/receives radio signals to/from the mobile stations on the allocated channels. The receiver 207 also receives interfering signals from channels used by other connections. Seen generally, this interference is contingent on channel and time and can thus be described as I (channel, t). Each of the mobile stations MS1–MS3 includes a respective transmitter/receiver part 208–210 for radio signals to/from the base station. An interference I (channel, t) is also received in the receivers of the mobile stations. Allocation of channels which form the channel hop sequences in the hop sequence lists is effected in a channel allocation means 211 in the base station BS1, as described in more detail below. The channel hop sequences are then transferred from the channel allocation means 211 to the hop sequence lists 201–203, 204–206 of the base station and the mobile stations respectively, wherein a control channel, such as the control channel SACCH (Slow Associated Control Channel) is used for transmission to the mobile stations, as mentioned above. Transfer of the channel hop sequences to the hop sequence lists 204–206 is shown separated in the Figure by the broken line, for the sake of clarity, although it is effected in a known manner with the aid of the transmitters/receivers 207–210 under the control of a control unit CPU (FIG. 3). The base station and the mobile stations then know through the medium of the channel hop sequences on which channel transmission and reception shall take place in each time interval.

FIG. 3 is a block schematic which illustrates the channel allocation means 211 in the base station BS1 in more detail. The channel allocation means 211 includes a device 212 for generating a signal attenuation parameter, which indicates the extent to which a radio signal has been attenuated or dampened between the transmitter and the receiver for a given connection. In principle, the signal attenuation parameter can be generated for a given connection between a base station and a mobile station, by transmitting a measuring signal of known signal strength from the base station to the mobile station. The mobile station registers the strength of the received signal and reports the value back to the base station, therewith enabling the signal attenuation parameter to be calculated. In a mobile radio network for instance, signal attenuation in connections that are to be established or that have already been established is measured repeatedly. This measuring procedure is effected with the aid of control channels in a known manner, and hence the operational function of the device 212 will not be described in detail in this context.

Measuring of the signal attenuation parameter has been described here in the downlink, i.e. with regard to a measuring signal transmitted from the base station. It will be understood that the measuring signal may equally as well be transmitted from the mobile station, in which case the signal attenuation parameter is measured in the uplink. However, connection signal attenuation can be said to be the same in both the uplink and the downlink with good approximation, and hence it is normally unimportant with regard to application of the invention whether the signal attenuation parameter is determined in the uplink or in the downlink.

The device 212 generates a connection list 213 in which a signal attenuation parameter $\delta_1, \delta_2, \ldots$ is stored for respective connections F1, F2, . . . The signal attenuation parameters stored in the connection list 213 constitute input data for the algorithm used in allocating channels to the hop sequence lists in accordance with the following. A sorting device 214 compares the signal attenuation parameters with one another and stores the connections in accordance with the parameters in a sorted connection list 215, wherein the connection that has the lowest signal attenuation parameter is stored at the top of the connection list. The connection that has the lowest signal attenuation parameter is referenced $m_0$ in the sorted connection list 215, the connection that has the next lowest signal attenuation parameter is referenced $m_1$ and so on, the connection thus being arranged in sequence in accordance with increasing signal attenuation. When a connection has a low signal attenuation parameter, this will mean that the signal has small attenuation on the connection, the connection therewith being of good quality with regard to signal attenuation.

The channel allocation means 211 also includes a device 216 for generating a channel quality parameter, which indicates the extent to which a channel has been disturbed by interference. In principle, the channel quality parameter of a given channel can be generated by repeatedly measuring the interference on the channel. Alternatively, other parameters can be measured, or determined, for instance the channel bit error rate or the channel C/I value, and an interference value calculated from these values. In the case of a mobile radio network for instance, such channel interference measurements are made repeatedly in a known manner, and the operational function of the device 216 will not be described in detail in this context. U.S. Pat. No. 5,355,514 describes an example of channel interference measuring procedures.

The device 216 generates a channel list 217 in which a channel quality parameter I1, I2, . . . is stored for respective channels ch1, ch2, . . . The channel quality parameters stored in the channel list 217 constitute input data for the algorithm used in the allocation of channels to the hopsequence lists in accordance with the following. A sorting device 218 compares the channel quality parameters with each other and sorts the channels into a sorted channel list 219 in accordance with the channel quality parameters. The channel that has the lowest channel quality parameter is referenced $C_0$ in the sorted channel list 219, the channel that has the next lowest channel quality parameter is referenced $C_1$ and so on, the channels thus being ordered in a sequence according to rising channel quality parameters. If a channel has a low channel quality parameter, the channel suffers only small interference and is of good quality with regard to interference. In the case of this embodiment, only the best channels with regard to interference are stored in the sorted channel list 219, the number of stored channels being equal to the number of connections in the connection list. According to one alternative, the best channels are stored in the sorted channel list in a number that exceeds the number of connections established at that moment in time. This provides the possibility of obtaining additional capacity in the form of finished channel hop sequences which are ready for use immediately by a new connection when the connection is established.

The sorted connection list 215 and the sorted channel list 219 are connected to a device 220 for generating channel hop sequences. The device 220 allocates channels to the channel hop sequences in accordance with an inventive algorithm.

Expressed in simple terms, the algorithm functions to allocate to a connection which has low attenuation a number of low quality channels, expressed for instance as high interference, and a connection that has high attenuation is allocated a number of channels that have high quality, expressed for instance as low interference. This can be expressed in another, simpler way by saying that the better a connection with regard to attenuation, the poorer the channels with regard to interference or with regard to some other channel quality measurement that will be allocated to the connection. Channels are also allocated to the connections so as to ensure orthogonality, i.e. to ensure that not more than one base station connection will use the same channel at any one time.

The algorithm used to generate the channel hop sequences can be expressed in the following mathematical terms:

$$j = jm - jl - jh \quad (1)$$

where $jm = k-1+i-2 \cdot \text{modulo}(i+\text{modulo}(t, k), k)$ $jl = \min(jm+i-k+1, 0)/2$ $jh = \max(jm+i+k+1-2 \cdot n, 0)/2$ k=an integer which denotes the number of channels used by transmitter and receiver in a connection, i.e. the number of channels that form a channel hop sequence i=connection m, t=time interval (t=0, 1, . . . , k)

n=the number of connections at the time interval concerned j=channel $c_j$

The designation modulo(x, y) relates to the value of stages number y in a period including the x values. For instance, the periods 0, 1, 2 are obtained when x=3. When y=5, the value 1 is obtained which is the fifth stage in the period 0-1-2 (0-1-2-0-1). Thus, m(3, 5)=1.

If it is assumed that three of the channels are used with each channel hop sequence (k=3) and that seven connections ($m_0$–$m_6$) are established between a base station and seven mobile stations, an algorithm of the aforesaid type can give the following results.

| Cj | | | | | | | | |
|---|---|---|---|---|---|---|---|---|
| 6 | 2 | 1 | 0 | | | | | (2) |
| 5 | 1 | 0 | | 2 | | | | |
| 4 | 0 | | 2 | | 1 | | | ($\Delta t = 0, 1, 2$) |
| 3 | | 2 | | 1 | | 0 | | |
| 2 | | | 1 | | 0 | | 2 | |
| 1 | | | | 0 | | 2 | 1 | |
| 0 | | | | | 2 | 1 | 0 | M; |
| | 0 | 1 | 2 | 3 | 4 | 5 | 6 | |

The result is shown in a hop sequence matrix above. (It will be noted that the matrix can be presented in different ways by re-indexing, therewith enabling the more distinct matrix above to be obtained.) It will be seen from the hop sequence matrix that the connection $m_0$ (the best connection with regard to attenuation) has been allocated a channel hopsequence consisting of the channel $c_4$–$c_6$ (the three worst channels with regard to interference). The connection $m_6$ (the worst connection with regard to attenuation) has been allocated a channel hop sequence consisting of the channels $c_0$–$c_2$ (the three best channels with regard to interference). A connection of "average quality" such as the connection $m_3$ has been allocated the three channels of "average quality" $c_1$, $c_3$ and $c_5$. Thus, four connections with regard to the signal attenuation parameter are allocated successive channels which are successively better with regard to the channel quality parameter in a manner such as to obtain base orthogonality.

The digits 0, 1 and 2 in the hop sequence matrix represent the time interval in which the channel is used by a given connection. For instance, the connection $m_4$ uses the channel $C_4$ in time intervals $\Delta t = 1, 4, 7, 11, \ldots$ When the hopsequence matrix is examined row by row, or in other words channel by channel, it will be seen that base orthogonality is obtained by virtue of a given time interval appearing only once in each row.

As before mentioned, a predetermined number k of channels are used in the channel hop sequences. The value of k is a system parameter and can be given any desired value. When the channel hop sequence includes several channels, there is less dependency on each channel in the hop sequence. When fewer channels are used in the channel hop sequence, each channel in the sequence will generally be better than the channels in a hop sequence which uses more channels. It should be noted that the k value can be determined for each base station, and consequently the number of channels in two channel hopsequences from two disparate stations may differ.

The device 220 then generates a further channel hop sequence for each connection $m_0$–$m_6$, by using the duplex spacing as mentioned above. One channel hop sequence is then used by the base station transmitter and the other channel hop sequence is used by the base station receiver for respective connections. The two channel hop sequences for each connection are then stored in a respective hop sequence list in the base station, such as the hop sequence lists 201–203 in FIG. 3. The two channel hop sequences per connection are also sent to the mobile stations via a control channel, SACCH and there stored in respective hop sequence lists in the mobile stations, such as the lists 204–206 in FIG. 2.

A further possibility resides in the use of a random number generating device 221 to increase the functionality of the device 220. The device 221 generates randomly a unique integer between 0 and k for each time interval referenced 0, 1 and 2 in the above matrix. The same channels as those earlier used will thereby be used for each connection, although the order in which the channels appear in the channel hop sequence will be randomly reversed. For instance, if 0→2, 1→1, 2→0 after random generation in the device 221, the hop sequence matrix will have the following appearance. This enables periodically repeated disturbances between channel hop sequences from different base stations to be avoided.

| | | | | | | | | |
|---|---|---|---|---|---|---|---|---|
| 6 | 0 | 1 | 2 | | | | | (3) |
| 5 | 1 | 2 | | 0 | | | | |
| 4 | 2 | | 0 | | 1 | | | ($\Delta t = 0, 1, 2$) |
| 3 | | 0 | | 1 | | 2 | | |
| 2 | | | 1 | | 2 | | 0 | |
| 1 | | | | 2 | | 0 | 1 | |
| 0 | | | | | 0 | 1 | 2 | |
| | 0 | 1 | 2 | 3 | 4 | 5 | 6 | |

A control unit CPU in the channel allocation device 211 communicates with the aforedescribed devices and controls the described channel allocation procedure. This communication is effected through the medium of control signals that are sent between the control unit CPU and said devices, wherein the control signals are sent on a bus line 222 between the control unit and ports 212p, 213p, . . . , 221p, as shown schematically in FIG. 3.

Figure 4:
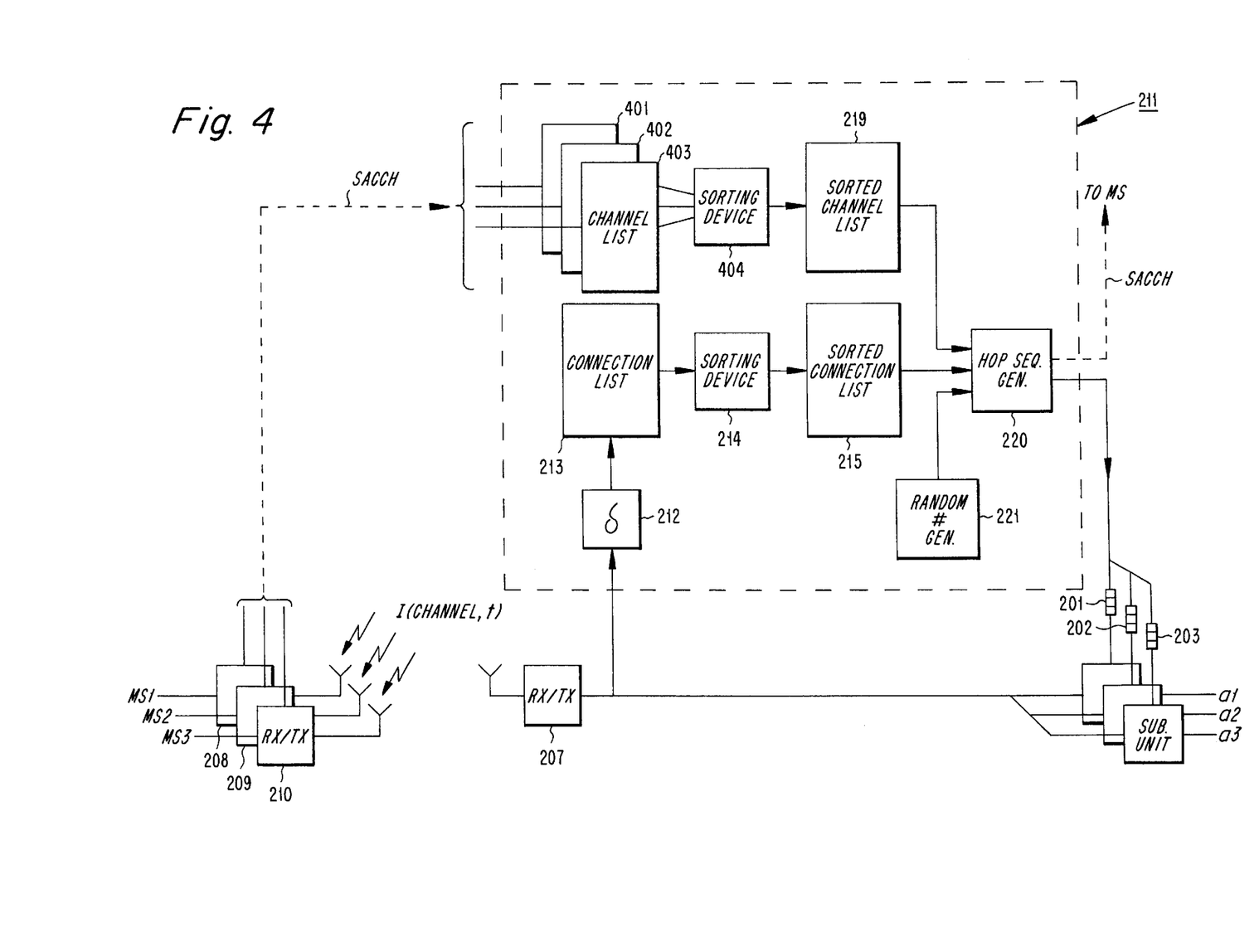
FIG. 4 is a block schematic illustrating a second exemplifying embodiment of the invention.

For the sake of simplicity and clarity, the control unit CPU with bus line 222 and ports 212p, 213p, . . . , 221p is not shown in the following Figures. FIG. 4 is a block schematic which illustrates a second embodiment of the invention and the channel allocation device 211. The sorted channel list 219 is obtained in a way different to that described with reference to the FIG. 3 embodiment. In the case of the FIG. 4 embodiment, the interference is measured in the downlink of each mobile station MS1–MS3. Thus, each mobile station measures, or likewise determines, the interference of the channels and then sends these values to a respective channel list 401–403 in the base station via a control channel, as illustrated schematically in the Figure with the broken line referenced SACCH. This transmission of the measured interference values from the mobile stations to the channel lists in the base station is shown separated by the broken line in the Figure for the sake of clarity, although the transmission is carried out in a known manner with the aid of the transmitters/receivers 207–210. The channel lists 401–403 are corresponded by the channel list 217 in FIG. 3. Thus, the channel list 401, 402 and 403 includes a channel quality parameter I1, I2, . . . for respective channels ch1, ch2, . . . , this parameter being measured from the mobile station MS1, MS2 and MS3 respectively. A mean value generating and sorting device 404 then calculates a mean interference value for each channel and sorts the channels in accordance with the calculated mean interference values. The device 404 can produce a mean value image with the aid of any kind of unequivocal, monotonously expanding and non-linear reproduction (e.g. a logarithmic function), so as to avoid single extreme measurement values in the channel lists 401–403 being given an exaggerated significance in the final result. A linear mean value is then suitably established, whereafter the channels are sorted in accordance with the mean values thus formed, i.e. in accordance with increasing interference.

Only the best channels with regard to interference are then stored in the sorted channel list 219, the number of channels stored being equal to the number of connections similar to the FIG. 3 embodiment. Remaining devices 212–215 and 220–221 operate in the same manner as in FIG. 3 and will not therefore be described with reference to FIG. 4.

Figure 5:
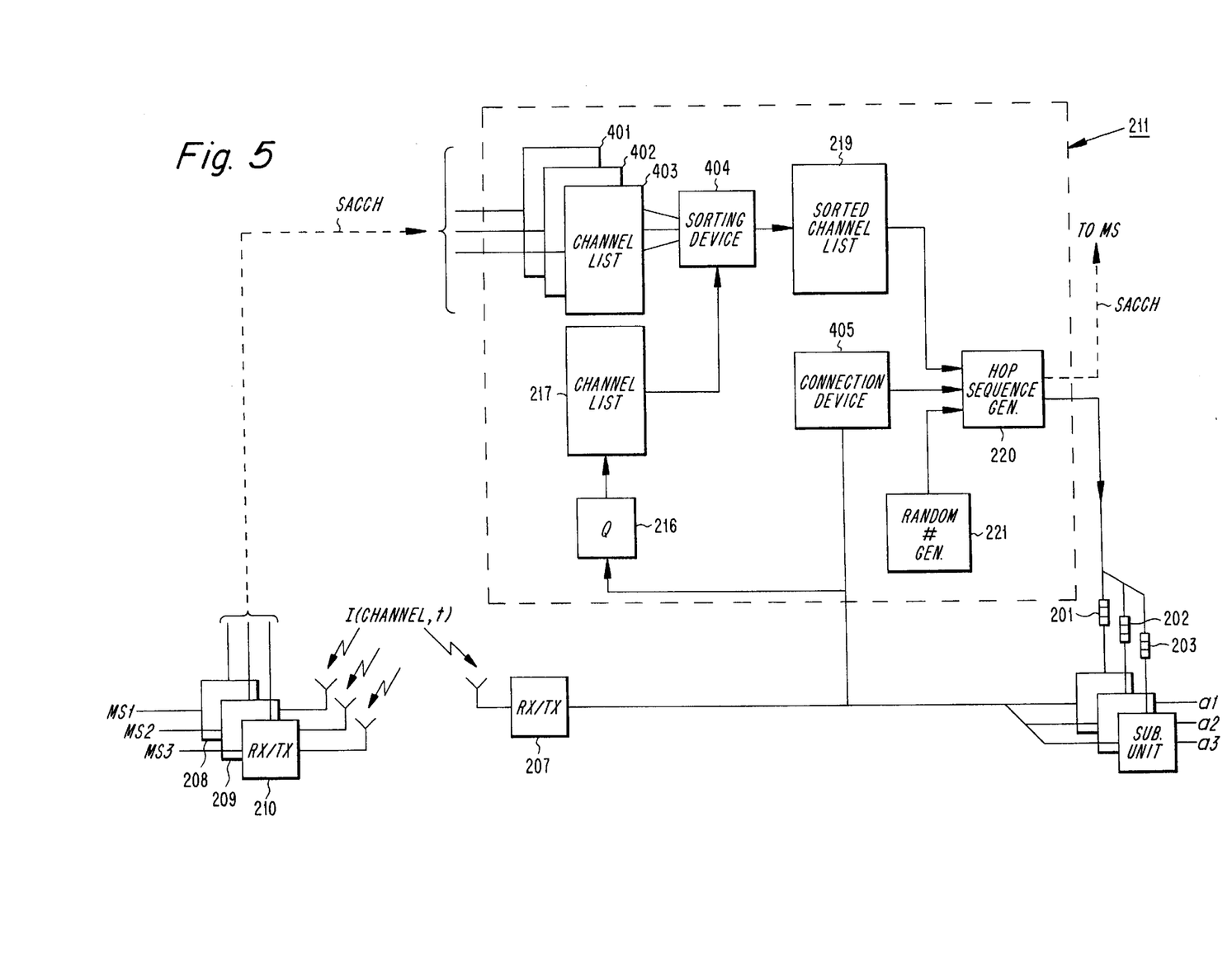
FIG. 5 is a block schematic illustrating a third exemplifying embodiment of the invention.

FIG. 5 is a block schematic which illustrates a third embodiment of the invention and the channel allocation device 211. Distinct from the two previously described embodiments illustrated in FIGS. 3 and 4, the sorted channel list 219 is obtained with the aid of the interference measurement values from both the uplink and the downlink. In the case of the FIG. 5 embodiment, interference is measured in the downlink of each mobile station MS1–MS3 in the same way as that described with reference to FIG. 4. Also used are the interference values measured in the uplink and stored in the channel list 217. This is achieved by using the device 216 for generating the channel quality parameter and the channel list 217 in the same way as that described with reference to FIG. 3. However, in the case of the FIG. 5 embodiment, the channel list 217 is connected to the mean value forming and sorting device 404, which operates in accordance with the principle described with reference to the FIG. 4 embodiment. This also enables the interference values measured in the uplink to be used in calculating the mean interference values. In FIG. 5, the devices 212–215 of FIG. 4 have been shown as one single device 405 for space reasons. The operating function of the device 405 thus corresponds to the operating functions of the devices 212–215 shown in FIG. 4.

Figure 6:
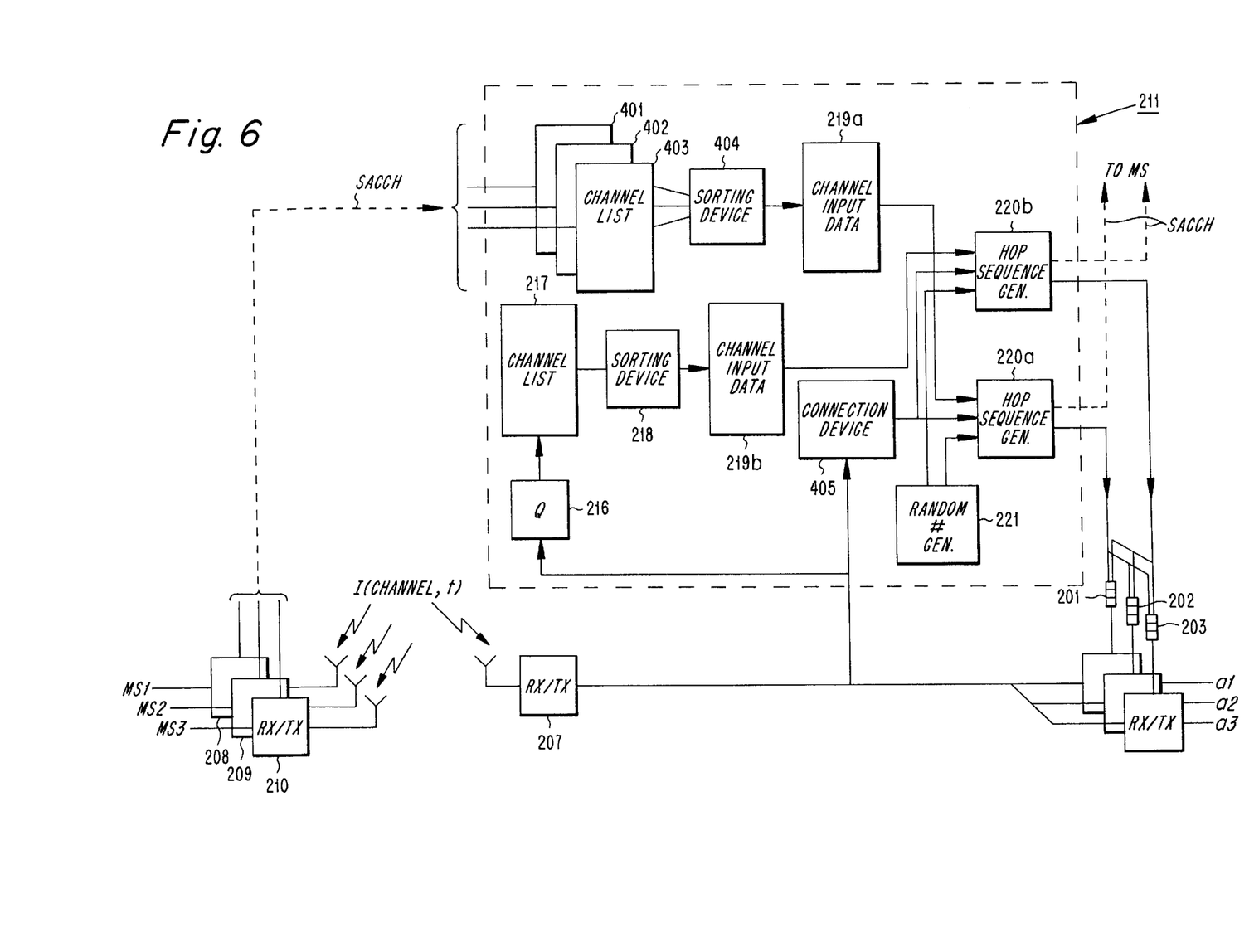
FIG. 6 is a block schematic illustrating a fourth exemplifying embodiment of the invention.

FIG. 6 is a block schematic which illustrates a fourth embodiment of the invention and the channel allocation device 211. Distinct from the aforedescribed embodiments, the duplex spacing is not used in creating channel hop sequences. Thus, the device 220a generates only one channel hop sequence for each connection in accordance with the hop sequence algorithm, which hop sequence can be used when transmitting from the base station, for instance. The channel hop sequence generating device 220b operates according to the same principles as the device 220a and generates a channel hop sequence for each connection in accordance with the hop sequence algorithm, these channel hop sequences being used for reception in the base station when the channel hop sequences generated in the device 220a are used for transmission in the base station. The device 220a receives channel input data from the device 219a. These channel input data have been obtained by measuring the interference in the downlink, as described with reference to FIG. 4. The device 220b receives channel input data from the device 219b. These channel input data have been obtained by measuring the interference in the uplink, as described with reference to FIG. 3. Because the interference values measured in the uplink and the downlink are not mixed in the device 404, as described with reference to FIG. 5, completely independent channel hop sequences can be generated in the devices 220a–220b, wherein one channel hop sequence is used for transmission and the other channel hop sequence is used for reception in the base station. The channel hop sequences are stored in the base station in the hop sequence lists 201–203 and transmitted on the control channel SACCH to the hop sequence lists 204–206 in the mobile stations, in the same way as that described above.

Figure 7:
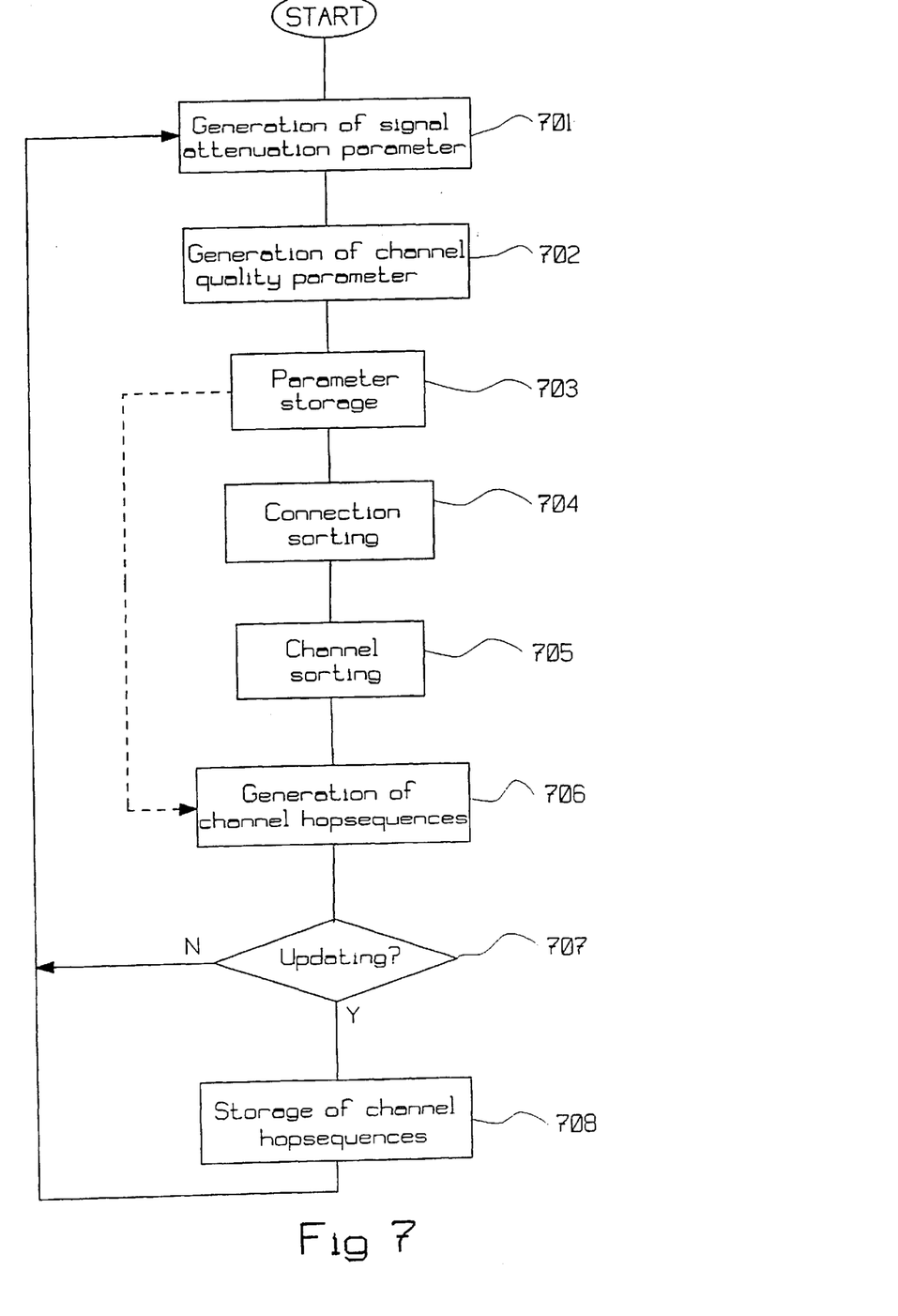
FIG. 7 is a flowsheet which illustrates schematically the inventive channel hopping procedure.

FIG. 7 is a flowsheet illustrating an inventive channel hop method.

The signal attenuation parameter δ is generated in stage 701 for each established connection F1–F3. The signal attenuation parameter can be generated by measuring attenuation in the uplink and/or the downlink of each connection.

The channel quality parameter is then generated in stage 702 for each channel ch1–chn. The term "each channel" may relate to all channels in a base station or in the telecommunications system as a whole, or to a predetermined subset of these channels. The channel quality parameter can be generated by measuring the interference in the uplink and/or the downlink of each channel. Other magnitudes may also be measured, such as the C/I value or the bit error rate, and an interference value for each channel can be calculated as input data on the basis of these magnitudes.

The signal attenuation parameters and channel quality parameters are stored in respective connection lists and channel lists 213, 217 in stage 703.

In stage 704, the connections are sorted in accordance with the measured signal attenuation parameter (attenuation) and the connections are then stored in the sorted connection list 215. When using the measurement values from the uplink or from both the uplink and the downlink, a mean attenuation value is calculated for each connection and the connections are then sorted in accordance with the calculated mean value.

In Stage 705, the channels are sorted in accordance with the measured channel quality parameter (the interference) and the best channels with regard to interference are then stored in the sorted channel list 219. If the measurement values from the uplink or from both the uplink and the downlink are used, a mean interference value is calculated for each channel and the channels are then sorted in accordance with the calculated mean value. The number of channels stored in the sorted channel list must be at least equal to the number of established connections at each moment in time. When the number of channels is equal to the number of connections, each channel will be used by one of the connections in each time interval. Free capacity (free channel hop sequences) can be obtained by storing in the sorted channel list more channels than the number of established connections, this free capacity being immediately available for use when a new connection is to be established.

The preferred hop sequence algorithm described above is applied in stage 706. This provides a channel hop sequence for each connection, wherein the channel hop sequence can be used for transmission from either the base station or the mobile station. A channel hop sequence corresponding to that used for reception can be obtained by using the duplex spacing as mentioned above. A further possibility is one of producing channel hop sequences for both transmission and reception for each connection, with the aid of the hop sequence algorithm, i.e. without using the duplex spacing. It will be understood that a channel hop sequence which is used for transmission in the base station can be used for reception in the mobile station, and that a channel hop sequence which is used for transmission in the mobile station shall be used for receiving in the base station.

In stage 707, a check is made to ascertain whether or not the allocation of channel hop sequences to the hop sequence lists 201–203, 204–206 shall be updated. If the answer is positive (yes) in accordance with alternative J, the channel hop sequences are stored in stage 708 and the procedure then repeated from stage 701. If the answer is negative (no) according to an alternative N, the procedure is repeated from stage 701 without updating the allocation.

Whether or not the channel hop sequences shall be updated is thus determined by a monitoring procedure carried out in stage 707, for instance with the aid of the control unit CPU. The channel allocation device 211 is able to create "new" channel hop sequences continuously, wherein a new channel hop sequence can replace an "old" channel hop sequence, for instance when the disparity in call quality for the two channel hop sequences exceeds a predetermined level value, or when the interference level exceeds a predetermined value. Updating need not be a full updating, i.e. the channel hop sequences need only be updated with regard to those connections where the disparities in call quality exceed the limit value. Among other things, updating may be necessary when establishing new connections or when reception conditions have changed due to movement of the mobile stations.

In stage 708, the generated channel hop sequences are stored in the hop sequence lists 201–203, 204–206 in the base station and in the mobile stations, when it is ascertained in stage 707 that updating shall be carried out. The base station has a hop sequence list for each connection, and each of the hop sequence lists includes channel hop sequences for transmission and reception respectively. The transmission and reception channel hop sequences to be used by the mobile stations are sent to these stations via a control channel SACCH and are then stored in respective hop sequence lists in the mobile stations. The procedure is repeated after stage 708, wherein a hop is made to stage 701.

As an alternative, stage 704 and 705 can be omitted, wherein the information stored in the connection lists and channel lists 213, 217 constitutes input data for the hop sequence algorithm used in stage 706. It will be noted that in this case, the hop sequence algorithm does not function in the aforedescribed manner. Because no sorted connection lists and channel lists have been produced, the hop sequence algorithm must itself find those channels that can be used and allocate these channels to the correct connection. Thus, the actual hop sequence algorithm can be implemented in several ways, although all algorithms function in accordance with the principle that the better the connection with regard to a signal-damping parameter, the poorer the channels with regard to a channel quality parameter that are allocated to the connection.

As an alternative, the hop sequence lists in the base and mobile stations may include only one channel hop sequence. In this case, means are provided for generating a further channel hop sequence for each connection, e.g. by using the duplex spacing. The aforesaid means then allocates one of the channel hop sequences to the transmitter and the other hop sequence to the receiver.

In the preferred embodiments described above, the radio communications system has been described as including base stations within whose respective coverage areas available channels are used in base orthogonal channel hop sequences in communication with those mobile stations that are located within the area covered by a given base station. The base station can be considered generally as a first radio station and the mobile stations as a number of second radio stations. The available channels within a radio coverage area may comprise either a number of channels, that are allotted specifically to the base station, a subset of the total number of channels or all channels in the radio communications system, signal attenuation parameters being generated for these channels.

It is also possible to implement parts of the described embodiments in a mobile switching centre, MSC, or in a base station switching centre, BSC, which in this case will included means for achieving the functionality of the aforedescribed means and devices.

Although the Figures illustrate vehicle-carried mobile stations, it will be understood that the invention can also be applied in systems using portable, hand-carried mobile stations.

It will also be understood that the invention is not restricted to the aforedescribed and illustrated exemplifying embodiments thereof and that modifications can be made within the scope of the following claims.

We claim:

1. A method of channel hopping in a radio communications systems wherein channel hopping is effected between channels for connections between a base station and at least one mobile station in the radio communications system, and wherein the connections are subjected to signal attenuation and interference, said method comprising the steps of:

generating a signal attenuation parameter for the respective connections, wherein said signal attenuation parameter corresponds to the extent by which a desired signal has been attenuated when it is transmitted from a transmitter until it is received by a receiver;

generating a channel quality parameter for the respective channels;

generating at least one channel hop sequence for the respective connections, wherein a channel hop sequence includes a number of channels between which the connection hops, and wherein a channel hop sequence is generated in accordance with the signal attenuation parameter of the connections and the channel quality parameter of said channels, wherein the better a connection is with regard to the signal attenuation parameter, the poorer the channels will be with regard to the channel quality parameter in the channel hop sequence for that connection;

allocating the channel to a respective hop sequence list in the base station and in the mobile stations; and channel hopping between the channels in the channel that have been allocated to the hop sequence lists when communicating by radio on the connections between the base station and the mobile stations.

2. A method of base orthogonal channel hopping in a radio communications system wherein channel hopping is effected between channels for connection between a base station and at least one mobile station in the radio communications system, wherein the connections are subjected to signal attenuation and interference and wherein the method comprises the steps of:

generating a signal attenuation parameter for the respective connections, wherein said signal attenuation parameter corresponds to the extent by which a desired signal has been attenuated when it is transmitted from a transmitter until it is received by a receiver;

generating a channel quality parameter for the respective channels;

generating at least one channel hop sequence for the respective connections, said channel hop sequences being base orthogonal so that at most one of the connections will use a channel pointed-out in the base station at each time point, wherein a channel hop sequence includes a number of channels between which the connection hops, wherein said at least one channel hop sequence is generated in accordance with the signal attenuation parameter of the connections and the channel quality parameter of said channels, wherein the better a connection is with regard to the signal attenuation parameter, the poorer the channels will be with regard to the channel quality parameter in the channel hop sequence for that connection;

allocating the channel hop sequences to a respective hop sequence list in the base station and in the mobile stations; and channel hopping between the channels in the base orthogonal channel hop sequences that have been allocated to the hop sequence lists when communicating by radio on the connections between the base station and the mobile stations.

3. A method according to claim 1, wherein generation of the hop sequences comprises:

selecting the best connection with regard to the signal attenuation parameter;

allocating the worst channels with regard to the channel quality parameter to the best connection in a number which corresponds to the number of channels, these worst channels forming a channel hop sequence for the best connection;

selecting successively power connections with regard to the signal attenuation parameter;

allocating successively better channel with regard to the channel quality parameter to the successively poorer connections, in a number which coincides with the number of channels, wherein said successively better channel form a channel hop sequence for the successively poorer connections;

choosing the poorest connection with regard to the signal attenuation parameter; and allotting the best channels with regard to the channel quality parameter to the poorest connection, in a number which coincides with the number of channels, wherein these best channels form a channel hop sequence for the poorest connection.

4. A method according to claim 1, further including the steps of:

sorting the connection with regard to the signal attenuation parameter; and storing the sorted connections in a sorted connection listed, wherein the connections are stored while sorted in accordance with the signal attenuation parameter.

5. A method according to claim 1, further including the steps of:

sorting-out the best channels with regard to the channel quality parameter in a number corresponded by the number of connections, and generating channel hop sequences for established connections; and storing the sorted channels in a sorted channel list, said channel being stored sorted in accordance with the channel quality parameter.

6. A method according to claim 1, further including the steps of:

sorting-out the best channels with regard to the channel quality parameter in a number which exceeds the number of connections, wherein channel hop sequences of connections that are still not established are generated before establishing the connection; and storing the sorted channels in a sorted channel list, wherein the channels are stored sorted in accordance with the channel quality parameter.

7. A method according to claim 5, wherein respective connections are selected is accordance with their positions in the sorted connection list and wherein channels are allocated to the respective chosen connections in accordance with said connections and in accordance with the positions of said channels in the sorted channel list.

8. A method according to claim 7, wherein channel allocation is base orthogonal.

9. A method according to claim 8, wherein generation of the channel hop sequences includes generating of a further channel hop sequence for each channel hop sequence that has already been generated, by using a duplex spacing, wherein pairs of channel hop sequences are generated for said connections, and wherein the channels in each pair of channel hop sequences are mutually separated by the duplex spacing.

10. A method according to claim 8, wherein generation of the channel hop sequences comprising the steps of generating two channel hop sequences for respective connections, wherein said channel hop sequences are generated in accordance with the signal attenuation parameter of the connections and in accordance with the channel quality parameter of said channels for both said channel hop sequences.

11. A method according to claim 10, wherein the signal attenuation parameters for the connections are generated by measuring signal attenuation in the uplink.

12. A method according to claim 10, wherein generation of the signal attenuation parameters for the connections includes measuring of the signal attenuation in the downlink.

13. A method according to claim 10, wherein generation of the channel quality parameters includes measuring one of the following group of values, the interference value, the C/I value and the bit error rate value for the channels in the uplink.

14. A method according to claim 10, wherein generation of the channel quality parameters includes measuring one of the following group of values the interference value, the C/I value and the bit error rate value for the channels in the downlink, and forming from said values a mean value relating to one and the same channel.

15. A method according to claim 10, wherein generation of the channel quality parameters includes measuring one of the following group of values the interference value, the C/I value and the bit error rate value for the channels in both the up- and the downlink, and forming from said values a mean value which relates to one and the same channel.

16. A method according to claim 10, wherein generation of the channel quality parameters includes measuring said values for those channels that are allocated to the base station.

17. A method according to claim 1, wherein generation of the channel quality parameters includes measuring said values for a subset of all channels included in the radio communications system.

18. A method according to claim 1, wherein generation of the channel quality parameters includes measuring said values for all channels included in the radio communications system.

19. A method according to claim 18, wherein allocation of the channel hop sequences includes the transmission of one of the channel hop sequences in said pair to a respective hop sequence list and in the mobile station respectively.

20. A method according to claim 19, comprising transferring the channel hop sequences to the hop sequence lists of the mobile stations via a control channel.

21. An arrangement relating to radio communications systems and including a base station and at least one mobile station, wherein channel hopping is effected between channels for connections between the base station and the mobile stations, and wherein the connections are subject to signal attenuation and interference, said arrangement comprising:

means for generating a signal attenuation parameter for respective connections, wherein said signal attenuation parameter corresponds to the extent by which a desired signal has been attenuated when it is transmitted from a transmitter until it is received by a receiver;

means for generating a channel quality parameter for respective channels;

means for generating at least one channel hop sequence for respective connections, wherein a channel hop sequence includes a number of channels between which the connection hops, and wherein said channel hop sequence is generated in accordance with the signal attenuation parameter of the connections and the channel quality parameter of the channels, wherein the better a connection is with regard to the signal attenuation parameter, the poorer the channels will be with regard to the channel quality parameter in the channel hop sequence for that connection; and means for allocating the channel hop sequences to a respective hop sequence list of the base station and the mobile stations and for controlling channel hopping between the channels in the channel hop sequences that have been allocated to the hop sequence lists, when communicating by radio connections between the base station and the mobile stations.

22. An arrangement relating to radio communications systems, wherein the arrangement includes a base station and at least one mobile station, wherein base orthogonal channel hopping is effected between channels for connections between the base station and the mobile stations, and wherein the connections are subject to signal attenuation and interference, said arrangement comprising:

means for generating a signal attenuation parameter for respective connections, wherein said signal attenuation parameter corresponds to the extent by which a desired signal has been attenuated when it is transmitted from a transmitter until it is received by a receiver;

means for generating a channel quality parameter for respective channels;

means for generating at least one channel hop sequence for respective connections, wherein said channel hop sequences are based orthogonal so that at most one of the connections will use as indicated channel within the base station at each time point, and wherein a channel hop sequence includes a number of channels between which the connection hops, and wherein said at least one channel hop sequence is generated in accordance with the signal attenuation parameter of the connections and the channel quality parameter of the channels, wherein the better a connection is with regard to the signal attenuation parameter, the poorer the channels will be with regard to the channel quality parameter in the channel hop sequence for that connection; and means for allocating the channel hop sequences to a respective hop sequence list of the base station and the mobile stations, and for controlling channel hopping between the channels (ch1–ch6) in the base orthogonal channel hop sequences that have been allocated to the hop sequence lists when communicating by radio on the connections between the base station and the mobile stations.

23. An arrangement according to claim 21, further including:

means for sorting the connections with regard to their signal attenuation parameter; and means for storing the sorted connections, wherein the connections are stored sorted in accordance with said signal attenuation parameter.

24. An arrangement according to claim 21, further including:

means for sorting-out the best channels with regard to their channel quality parameter; and means for storing the sorted channels, wherein the channels are stored sorted in accordance with said channel quality parameter.

* * * * *